United States Patent [19]

Wells

[11] Patent Number: 5,085,345
[45] Date of Patent: Feb. 4, 1992

[54] HYDRAULIC DISPENSER

[76] Inventor: John R. Wells, 4372 Keystone Ave., Culver City, Calif. 90024

[21] Appl. No.: 411,225

[22] Filed: Sep. 22, 1989

Related U.S. Application Data

[63] Continuation of Ser. No. 722,429, Apr. 12, 1985, abandoned, which is a continuation of Ser. No. 513,780, Jul. 15, 1983, abandoned.

[51] Int. Cl.$^5$ .............................. B65D 35/28
[52] U.S. Cl. ..................... 222/95; 222/335; 222/386.5; 141/114
[58] Field of Search .............. 222/95, 263, 335, 386.5, 222/107, 395, 394, 334, 372, 204; 141/114, 1, 10, 98; 604/131, 132, 133

[56] References Cited

U.S. PATENT DOCUMENTS

| | | | |
|---|---|---|---|
| 2,529,937 | 11/1950 | Hale | 222/263 |
| 3,032,037 | 5/1962 | Huber | 604/133 |
| 3,121,614 | 2/1964 | Galster | 23/253 |
| 3,199,511 | 8/1965 | Kulick | 222/95 |
| 3,391,829 | 7/1968 | Gregory | 222/95 |
| 3,572,552 | 3/1971 | Guinn | 222/263 |
| 3,662,929 | 5/1972 | Sims | 222/386.5 |
| 3,736,099 | 5/1973 | Begg | 23/259 |
| 4,041,944 | 8/1979 | Rhodes | 222/386.5 |
| 4,147,278 | 4/1979 | Uhlig | 222/95 |
| 4,158,035 | 6/1979 | Haase | 422/100 |
| 4,299,222 | 11/1981 | Eckenhoff | 604/133 |

Primary Examiner—Robert P. Olszewski
Assistant Examiner—Kenneth Noland
Attorney, Agent, or Firm—Donald G. Lewis

[57] ABSTRACT

The invention is a hydraulic dispenser and a method for hydraulically dispensing sample liquids. The hydraulic dispenser acts as a hydraulic press to dispense sample liquids from an insertable magazine. The hydraulic dispenser includes a hydraulic pump hydraulically connected to a magazine coupler. The magazine acts as a store for the sample fluid and is inserted into the hydraulic dispenser and connected to the magazine coupler. If the magazine is disposable, it may be unloaded from the hydraulic dispenser and discarded after usage. The hydraulic pump can generate quantitative positive displacements of hydraulic liquid which are transmitted to the magazine coupler. The magazine coupler responds to the hydraulic displacements from the hydraulic pump by collapsing and expanding the magazine inserted therein and thereby expressing and aspirating sample liquid. A hydraulic dispenser loaded with a magazine can express sample liquid from the magazine by quantitative positive hydraulic displacement generated by the hydraulic pump. The invention combines the principle of the hydraulic press with the concept of an insertable magazine in order to dispense sample liquids by quantitative positive hydraulic displacement. The hydraulic press imparts accuracy; the insertable magazine imparts disposability and convenience.

12 Claims, 4 Drawing Sheets

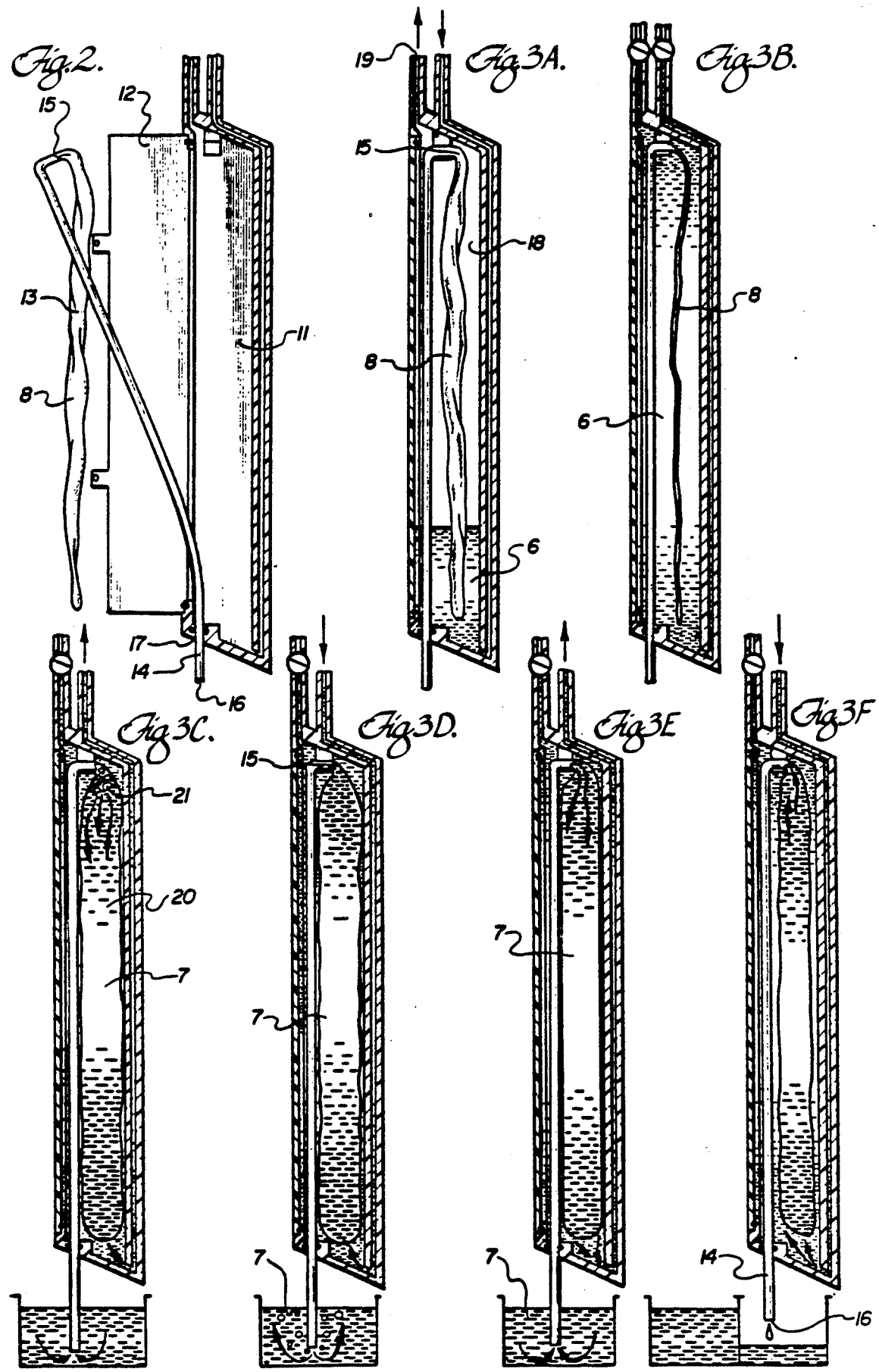

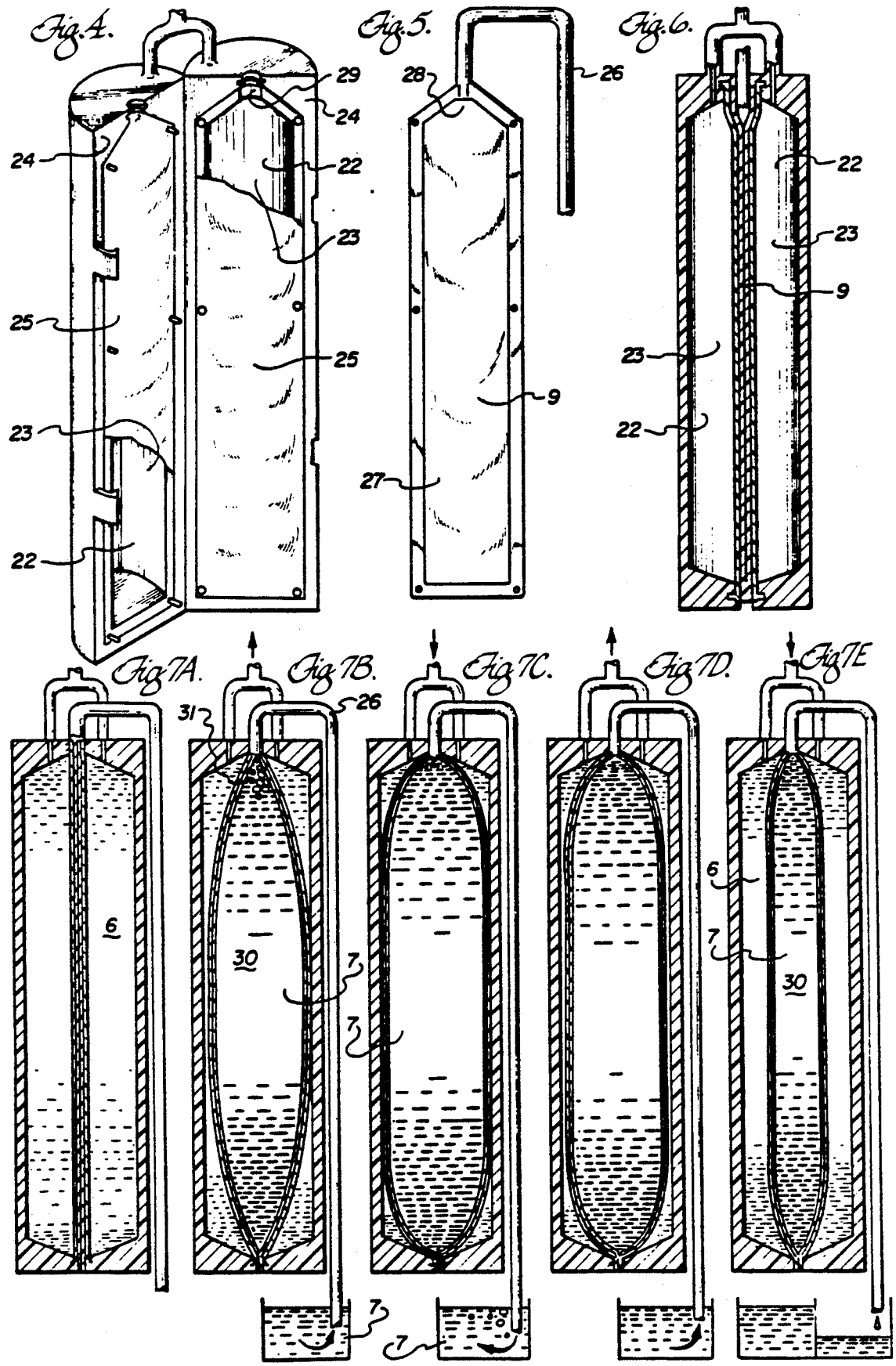

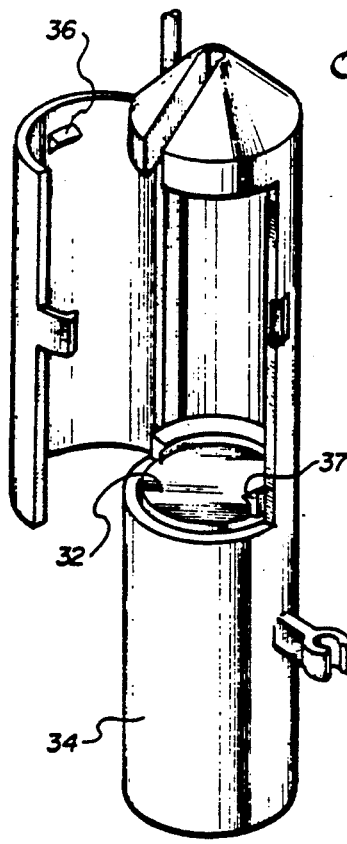
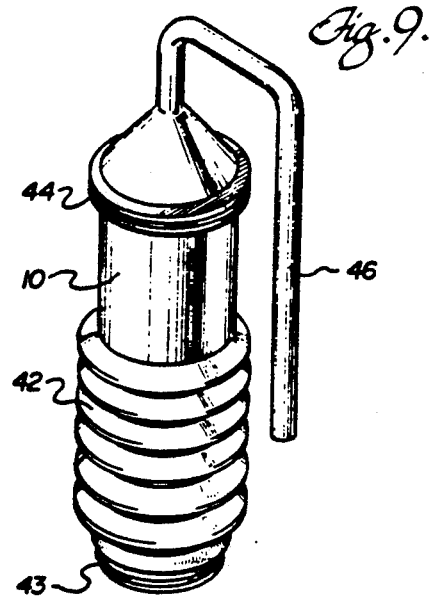
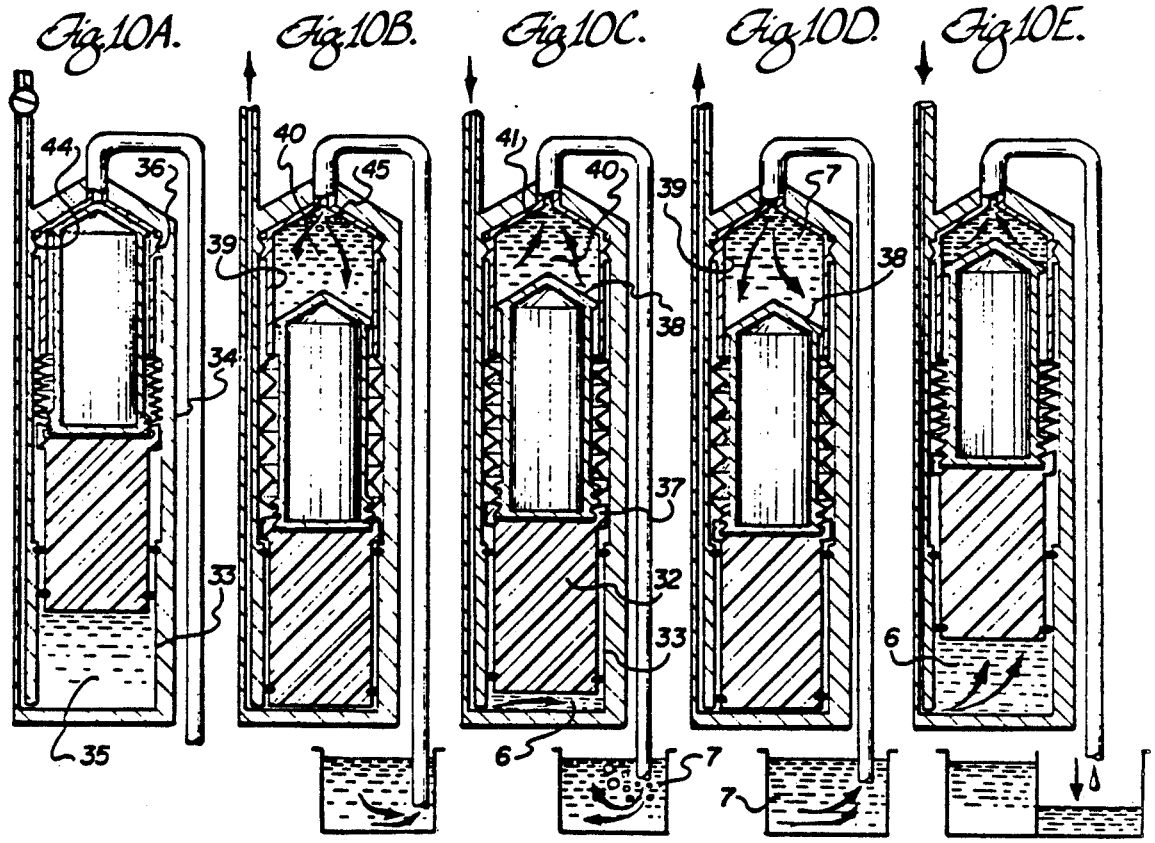

HYDRAULIC DISPENSER

This is a continuation of application Ser. No. 722,429, filed on Apr. 12, 1985, now abandoned, which is a continuation of Ser. No. 513,780, filed on July 15, 1983, now abandoned.

BACKGROUND OF THE INVENTION

The invention relates to the field of liquid handling. More specifically, the invention relates to dispensing devices which dispense sample liquid from a magazine which is inserted into the device and which include a hydraulic pump for collapsing the inserted magazine and dispensing sample liquid therefrom.

For many liquid handling applications both quantitative accuracy and cleanliness are required. The invention is a hydraulic dispenser which includes and combines the means to impart both quantitative accuracy and cleanliness. Quantitative accuracy is provided by the use of a hydraulic press and a hydraulic pump; cleanliness is provided by the use of an insertable magazine for containing the sample liquid. During operation, the insertable magazine is attached to and hydraulically coupled to the hydraulic press. The hydraulic pump within the hydraulic press acts on the coupled magazine in order to dispense sample liquid by means of quantitative positive hydraulic displacement.

The hydraulic press houses hydraulic liquid and includes the means to generate both quantitative positive displacements and reflux displacements of the enclosed hydraulic liquid. The hydraulic press includes a hydraulic pump and a magazine coupler hydraulically connected to one an other. When the insertable magazine and the magazine coupler are connected, the magazine coupler relays hydraulic displacements from the hydraulic pump to the magazine. Hydraulic displacements generated by the pump are relayed through the coupler to the magazine to cause the magazine to expand or to collapse. The magazine can be loaded with sample liquid either prior to insertion or after insertion. Reflux displacements generated by the pump cause an inserted magazine to expand and thereby to aspirate sample liquid; positive displacements generated by the pump cause the magazine to collapse and thereby to express sample liquid. The insertion and connection of a preloaded magazine without entrapped air establishes immediate hydraulic contact with the pump. If a magazine is loaded after insertion, hydraulic contact is established after the entrapped air is purged. The accuracy of dispensing for this invention depends on the accuracy of the quantitative positive displacements generated by the hydraulic pump and upon the establishment of hydraulic contact between the hydraulic pump and the sample liquid contained within the magazine. The accuracy of dispensing for this invention does not depend upon the accuracy of the reflux displacements.

Dispensers utililizing a hydraulic pump hydraulically coupled to a supply chamber for dispensing liquid from the supply chamber are known. Examples of the use of a hydraulic pump for dispensing liquids are illustrated in Guinn U.S. Pat. No. 3,572,552 and Haase U.S. Pat. No. 4,158,035. In each of these devices, the supply chamber is an integral and permanent part of the device. Neither of these devices includes the means to couple to an insertable magazine. Although these devices teach how to establish hydraulic contact between the pump and the diaphragm of the supply chamber, the devices do not teach how to establish hydraulic contact between the pump and the sample liquid enclosed by the supply chamber. The accuracy of these devices depends upon the accuracy of both the reflux displacement and the positive displacement, neither of which is hydraulically coupled to the sample liquid. These devices are not capable of positive hydraulic displacement of the sample liquid.

Positive displacement and reflux displacement should be distinguished. A positive displacement results from the assertion of an affirmative force. If the force underlying a positive displacement is sufficient, it will overwhelm any resistive properties of the sample liquid such as viscosity, surface tension, density, and vapor pressure and any extrinsic forces such as atmospheric pressure or gravity. A reflux displacement results from the force of atmospheric pressure when a pre-existing restraining force is removed. The accuracy of a reflux displacement is limited by the presence of resistive forces which may exceed the forces due to atmospheric pressure.

Positive hydraulic displacement should be distinguished from positive displacement. A positive hydraulic displacement results from the action of a positive force upon a train of mechanical parts and incompressible liquids contained in a rigid container. An initial positive force applied at one end is undissipated by the train. The train is not hydraulic if it includes a compressible component. When a positive force is applied at one end of a compressible train, the train will compress until its compression pressure matches the sum of all opposing resistive pressures. The effect is to dissipate the initial applied force. The displacement force at the far end of a compressible train is less than the initial applied force. Because the Guinn and Haase devices each allow air to be entrapped within their supply chambers, these devices can not be considered to be positive hydraulic displacement devices. All air must be purged from a hydraulic system for the system to be incompressible. Neither the Guinn device nor the Haase device illustrates how to establish hydraulic contact between the pump and the sample liquid.

An example of a device utilizing positive hydraulic displacement is illustrated in Hale U.S. Pat. No. 2,529,937. The Hale device hydraulically couples a displacement liquid with the sample liquid for controlling and metering the flow rate of the sample liquid. The Hale device does not include means for dispensing individual aliquots of the sample liquid or for aspirating sample liquid into the sample chamber. The Hale device does not include a pump or its equivalent which can generate quantitative displacements of the hydraulic liquid. The Hale device is useful for the continuous application of sample liquid at a measured flow rate.

An example of an other device utilizing positive hydraulic displacement is illustrated in Galster U.S. Pat. No. 3,121,614. The Galster device is a titration device which dispenses serial aliquots of identical volumes of standard solution into a test solution. The Galster patent illustrates how to hydraulically couple a pressure liquid with a titrating liquid for dispensing the titrating liquid. However, the Galster patent does not teach the concept of positive hydraulic displacement. Also, the Galster device does not include means to couple an insertable magazine to the pump. The sample chamber of the Galster device must be cleaned by flushing between uses of different titrating liquids.

Dispensers which utilize disposable magazines are known and widely used. The use of a disposable magazine improves the cleanliness and convenience of liquid handling. Disposable magazines are particularly useful for handling corrosive, radio active, and other toxic liquids.

An example of a dispensing device which combines the use of an insertable magazine with a hydraulic pump is illustrated in Begg U.S. Pat. No. 3,736,099. The Begg device is a convenient dispensing device because it combines some of the advantages of a hydraulic pump with the convenience of the insertable magazine. However, the Begg device does not include the means to establish hydraulic contact between the pump and the sample liquid. The Begg patent does not teach how to purge entrapped air from the inserted magazine; the Begg device does not teach how to insert and to connect a preloaded magazine to the dispensing device.

SUMMARY OF THE INVENTION

The invention is a hydraulic dispenser and a method for dispensing sample liquids. The hydraulic dispenser is a hydraulic press which includes a hydraulic pump and a magazine coupler hydraulically connected to each other. The hydraulic pump houses hydraulic liquid and generates quantitative positive displacements of the hydraulic liquid contained therein. The magazine coupler includes means to couple to an insertable magazine. The insertable magazine can be inserted or removed from the magazine coupler of the hydraulic dispenser. The magazine includes an enclosure which serves as a store for the sample liquid. A tubular spout communicating to the enclosure serves as a guide for transferring sample liquid to and from the magazine. The magazine coupler includes means to hydraulically couple to the magazine when it is inserted. The purpose of the magazine coupler is to relay hydraulic displacements between the hydraulic pump and the insertable magazine. When hydraulic contact is established between the hydraulic pump and the sample liquid enclosed within the magazine, the hydraulic dispenser dispenses sample liquid by positive hydraulic displacement.

The hydraulic pump is hydraulically connected to the magazine coupler with hydraulic liquid. The hydraulic pump can generate either positive or reflux displacements of the enclosed hydraulic liquid. Also, the hydraulic pump can generate quantitative positive hydraulic displacements. The magazine coupler includes means to receive the hydraulic displacements from the pump and to relay these displacements to the inserted magazine. The hydraulic pump can be controlled by the user to generate, meter, and transmit a range of quantitative displacements of hydraulic liquid.

To use the hydraulic dispenser, the magazine is inserted into the hydraulic dispenser and connected to the magazine coupler. The magazine enclosure can expand or collapse in response to displacements generated by the pump and relayed by the magazine coupler. Expanding the magazine enclosure causes sample liquid to aspirate into the enclosure through the tubular spout; collapsing the magazine enclosure causes the content of the enclosure to express through the tubular spout. Loading the magazine with sample liquid and eliminating the enclosed air establishes hydraulic contact between the pump and the sample liquid in the enclosure. Once hydraulic contact is established, the hydraulic dispenser can express sample liquid from the magazine by quantitative positive hydraulic displacement.

In order to establish hydraulic contact between the sample liquid and the hydraulic pump, all entrapped air must be eliminated from the system. Hydraulic contact may be established by inserting a magazine which is loaded with sample liquid and purged of entrapped air prior to insertion. If the magazine is loaded and purged prior to insertion, the spout of the magazine should be stoppered until the hydraulic connection is established. Alternatively, hydraulic contact may be established after inserting an unloaded magazine. If the magazine is loaded and purged after insertion, the elimination of entrapped air from the magazine establishes hydraulic contact.

A purgable magazine is used to facilitate the elimination of entrapped air. A purgable magazine includes an enclosure for containing sample liquid with a spout which exits from the topmost part of the enclosure. Entrapped air floats to the top most part of the enclosure when the dispenser is held in its normally upright position. When the purgable magazine is collapsed, the entrapped air will vent from the magazine prior to the expression of sample liquid. The expression of a stream of sample liquid from the magazine assures that the purging of entrapped air is complete.

The magazine may be a disposable. The dispenser is configured to facilitate the insertion and removal of the magazine and its connection to and disconnection from the coupler.

The magazine coupler includes several species. The preferred embodiment of each of three species is described. Each species is optimal for a different application. The three species include an immersion coupler, a diaphragmatic coupler, and a mechanical coupler.

The immersion coupler couples with its magazine by immersing the magazine in hydraulic liquid within a hydraulic chamber. The hydraulic chamber is a rigid chamber for enclosing both the hydraulic liquid and the insertable magazine. The insertable magazine which couples with the immersion coupler is a bag magazine. The bag magazine includes a flexible bag structure which can be inserted and enclosed within the rigid chamber. The flexible bag structure encloses the sample liquid. The flexible bag structure is immersed in the hydraulic liquid after it is inserted into the rigid chamber.

The diaphragmatic coupler is similar to the immersion coupler, except that a diaphragm partitions the rigid chamber to form a hydraulic compartment for containing the hydraulic liquid. The diaphragm partitions the hydraulic fluid from the magazine. The rigid chamber encloses both the hydraulic compartment containing the hydraulic liquid and the magazine containing the sample liquid. The magazine which couples with the diaphragmatic coupler is a envelope magazine. The envelope magazine includes a flexible envelope structure which conforms with the shape of the diaphragm. Hydraulic displacements are transmitted from the hydraulic compartment to the flexible envelope structure within the rigid chamber.

The mechanical coupler includes a coupler piston and coupler cylinder which define a chamber for enclosing the hydraulic liquid. The magazine which couples to the mechancial coupler is a mechanical magazine. The mechanical magazine includes a magazine piston and a magazine cylinder which define an enclosure for containing the sample liquid. When the mechanical magazine is inserted, the coupler piston is mechanically coupled to the magazine piston and the coupler cylinder and the magazine cylinder are each held by the housing in fixed relative positions. Hydraulic displacements are mechanically coupled through the pistons from the hydraulic pump to the sample liquid.

It is a purpose of this invention to dispense sample liquid from a magazine by means of quantitative positive hydraulic displacement.

It is a purpose of this invention to dispense sample liquid from a disposable magazine by means of quantitative positive hydraulic displacement.

It is a purpose of this invention to dispense sample liquid from a purgable magazine by means of quantitative positive hydraulic displacement.

It is a purpose of this invention to dispense sample liquid by means of quantitative positive hydraulic displacement from a magazine which can be easily inserted and removed from the dispenser.

It is a purpose of this invention to dispense sample liquid from a magazine by means of quantitative positive hydraulic displacement where the means for generating said quantitative positive hydraulic displacement is separated and remote from the magazine.

It is a purpose of this invention to dispense sample liquid from a purgable magazine having an enclosure to hold the sample liquid with a tubular spout which communicates with the topmost part of the enclosure so that collapsing the enclosure causes entrapped air to be eliminated from the enclosure prior to the expression of sample liquid.

BRIEF DESCRIPTION OF THE DRAWINGS

FIG. 1 shows the preferred embodiment of each of three species of magazine coupler, viz. an immersion coupler, diaphragmatic coupler, and a mechanical coupler. Inserted into each species of magazine coupler is its corresponding magazine, viz. a bag magazine in the immersion coupler, an envelope magazine in the diaphragmatic coupler, and a mechanical magazine in a mechanical coupler.

FIG. 2 is a sectional view of the immersion coupler illustrated in FIG. 1 shown with the port in the open position and illustrating the insertion of the bag magazine into the rigid chamber and showing a constant volume tubular spout connected to the bag magazine and passing from the rigid chamber through an exit, thereby stopping the exit.

FIGS. 3 (a), (b), (c), (d), (e), and (f) are each sectional views of the immersion coupler illustrated in FIG. 2 shown with an inserted bag magazine illustrating the sequence for using the hydraulic dispenser.

FIG. 3 (a) illustrates the immersion coupler with the bag magazine inserted and the port sealed closed and shows the flooding of the rigid chamber by the positive displacement of hydraulic liquid generated by the hydraulic pump (shown in FIG. 1 and indicated by the arrow pointing inward) and shows the venting of entrapped air from the rigid chamber through the vent (indicated by the arrow pointing outward).

FIG. 3 (b) illustrates the completion of the flooding of the rigid chamber with hydraulic liquid, the completion of the venting of entrapped air from the rigid chamber, and the establishment thereby of hydraulic contact between the hydraulic pump and the flexible bag structure.

FIG. 3 (c) illustrates the reflux of hydraulic liquid from the rigid chamber back into the hydraulic pump (indicated by arrow) and the resultant aspiration of sample liquid into the flexible bag structure.

FIG. 3 (d) illustrates the positive displacement of hydraulic liquid into the rigid chamber which firstly results in the expression of entrapped air from the topmost part of the flexible bag structure and secondly results in the expression of sample liquid from the tubular spout (indicated by arrows), thereby indicating the completion of the purging of entrapped air and the establishment of hydraulic contact between the hydraulic pump and the sample liquid enclosed by the flexible bag structure.

FIG. 3 (e) illustrates the reflux of hydraulic liquid back into the pump which results in the further aspiration of sample liquid into the flexible bag structure.

FIG. 3 (f) illustrates the quantitative positive displacement of hydraulic liquid into the rigid chamber which the immersion coupler transmits to the sample liquid enclosed in the flexible bag structure resulting in the quantitative expression of sample liquid from the tubular spout of the bag magazine.

FIG. 4 is a view in perspective of the preferred embodiment of the diaphragmatic coupler illustrated in FIG. 1 shown in the open position and illustrating two fragments of the diaphragm partially covering the interior of the rigid chamber.

FIG. 5 is an orthogonal view of an envelope magazine illustrated in FIG. 1 adapted for insertion in the diaphragmatic coupler illustrating a flexible envelope structure connected to a constant volume tubular spout.

FIG. 6 is a sectional view of the diaphragmatic coupler illustrated in FIG. 4 in the closed position with an inserted envelope magazine illustrated in FIG. 5 showing the rigid chamber and the interior of the hydraulic compartment and showing the details of a substantially airless fit between the diaphragm and the flexible envelope structure of the inserted envelope magazine.

FIGS. 7 (a), (b), (c), (d), and (e) are each sectional views of the diaphragmatic coupler illustrated in FIG. 6 shown in the closed position with an inserted envelope magazine having a substantially airless fit with the diaphragm and illustrating the sequence for using the hydraulic dispenser.

FIG. 7 (a) illustrates the hydraulic compartment swollen with hydraulic liquid so as to exclude substantially all air from the region between the diaphragm and the flexible envelope structure, thereby establishing hydraulic contact between the hydraulic pump and the flexible envelope structure.

FIG. 7 (b) illustrates the reflux of hydraulic liquid from the hydraulic compartment back into the hydraulic pump and the resultant aspiration of sample liquid into the flexible envelope structure.

FIG. 7 (c) illustrates the positive displacement of hydraulic liquid into the hydraulic compartment which firstly results in the expression of entrapped air from the topmost part of the flexible envelope structure and secondly results in the expression of sample liquid from the tubular spout (indicated by arrows), thereby indicating the completion of the purging of entrapped air and the establishment of hydraulic contact between the hydraulic pump and the sample liquid enclosed by the flexible envelope structure.

FIG. 7 (d) illustrates the reflux of hydraulic liquid back into the pump and further aspiration of sample liquid into the flexible envelope structure.

FIG. 7 (e) illustrates the quantitative positive displacement of hydraulic liquid into the hydraulic compartment. The diaphragmatic coupler transmits the displacement to the flexible envelope structure and the sample liquid enclosed therein, resulting in the quantitative expression of sample liquid from the tubular spout of the envelope magazine.

FIG. 8 is a view in perspective of the preferred embodiment of the mechanical coupler as illustrated in FIG. 1. FIG. 8 shows the piston brace on the coupler piston for attachment to the magazine piston and the housing brace on the magazine housing for attachment to the magazine cylinder.

FIG. 9 is a view in perspective of the mechanical magazine as illustrated in FIG. 1. FIG. 9 shows the magazine cylinder with its cylinder brace receptor; shows the tubular spout connected to the magazine cylinder; and shows a bellows serving to cover the magazine piston to protect against contamination of the mechanical magazine enclosure.

FIGS. 10(a), (b), (c), (d), and (e) are each sectional views of the mechanical coupler illustrated in FIG. 8 and with the mechanical magazine illustrated in FIG. 9 inserted therein and showing the sequence for using the hydraulic dispenser.

FIG. 10 (a) illustrates the mechanical coupler with an inserted mechanical magazine, the piston brace connecting the coupler piston to the magazine piston and the housing brace connecting the coupler housing to magazine cylinder and thereby fixing the relative positions of the coupler cylinder and the magazine cylinder. FIG. 10 (a) illustrates the coupler chamber filled with hydraulic liquid from the hydraulic pump; and illustrates the magazine enclosure in a collapsed position, thereby illustrating the hydraulic contact between the mechanical coupler and the mechanical magazine.

FIG. 10 (b) illustrates the reflux of hydraulic liquid from the coupler chamber back into the hydraulic pump and the resultant aspiration of sample liquid into the magazine enclosure.

FIG. 10 (c) illustrates the positive displacement of hydraulic liquid into the coupler chamber and the expression of entrapped air from the topmost part of the magazine enclosure and the expression of sample liquid from the magazine enclosure, thereby establishing hydraulic contact between the hydraulic pump and the sample liquid enclosed by the magazine enclosure.

FIG. 10 (d) illustrates the reflux of hydraulic liquid from the coupler chamber back into the pump and further aspiration of sample liquid into the magazine enclosure.

FIG. 10 (e) illustrates the quantitative positive displacement of hydraulic liquid into the coupler chamber. The quantitative positive hydraulic displacement is mechanically transmitted to the sample liquid in the magazine enclosure and results in the quantitative expression of sample liquid from the tubular spout of the mechanical magazine.

DESCRIPTION OF THE PREFERRED EMBODIMENTS

Figure 1:
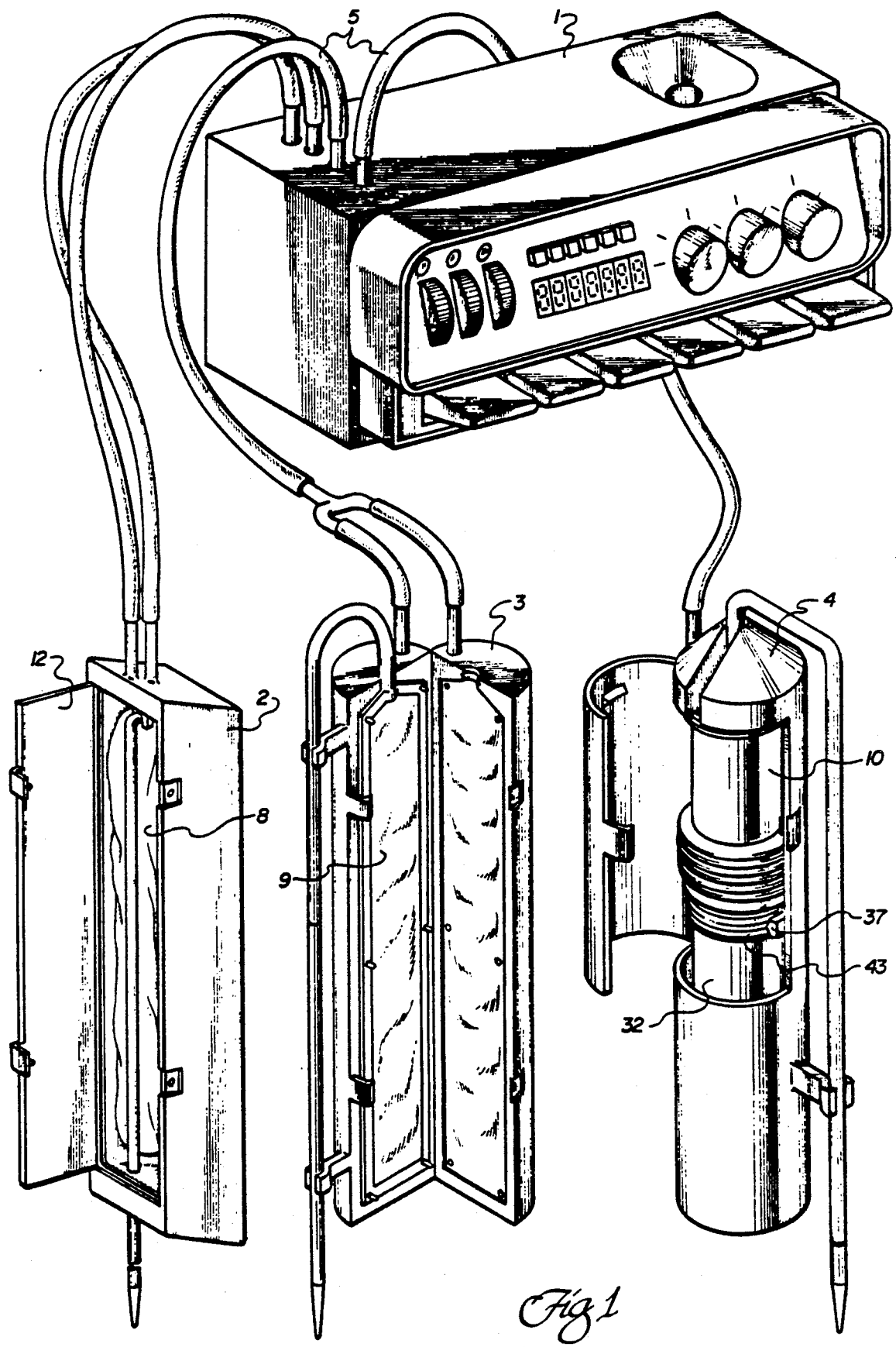
FIG. 1 is a view in perspective of a preferred embodiment of the hydraulic dispenser. The hydraulic dispenser works on the principle of a hydraulic press and includes a hydraulic pump connected by hydraulic hose to magazine couplers.

A preferred embodiment of the hydraulic dispenser is shown in FIG. 1. The hydraulic dispenser works on the principle of the hydraulic press. As a hydraulic press, the hydraulic dispenser includes a hydraulic pump (1) which is hydraulically connected to a magazine coupler. FIG. 1 illustrates a schematic representation of the hydraulic pump (1) and a preferred embodiment of each of three species of the magazine coupler, viz. an immersion coupler (2), a diaphragmatic coupler (3), and a mechanical coupler (4). A hydraulic hose (5) connects the hydraulic pump (1) to one or more of the magazine couplers. Displacements of hydraulic liquid (6) are generated by the hydraulic pump (1) and communicate through the hydraulic hose (5) to the magazine couplers. The magazine couplers couple to magazines. The magazines include an enclosure for storing sample liquid (7). The magazine couplers are actuated by the hydraulic displacements to dispense sample liquid (7) from the magazine. The magazines can be inserted into or removed from the magazine couplers. FIG. 1 illustrates the magazine couplers in their open position for insertion or removal of the magazines.

Each species of magazine coupler requires a corresponding species of magazine to be adapted to the coupler. A preferred embodiment of each of the three corresponding species of magazine is shown in FIG. 1. A bag magazine (8) is used for the immersion coupler (2); an envelope magazine (9) is used for the diaphragmatic coupler (3); and a mechanical magazine (10) is used for the mechanical coupler (4).

The hydraulic pump (1) can generate both positive hydraulic displacements and reflux displacements. The positive hydraulic displacements force hydraulic liquid (6) through the hydraulic hose (5) and into the magazine coupler. The reflux displacements, draw hydraulic liquid (6) back through the hydraulic hose (5) from the magazine coupler into the hydraulic pump (1). The hydraulic pump (1) can also generate quantitative positive hydraulic displacements for dispensing sample liquid (7) from the inserted magazines.

The distance of separation between the magazine coupler and the hydraulic pump (1) is limited only by the length of the hydraulic hose (5). The location of the hydraulic pump (1) which controls the magazine coupler can be removed from the location where the dispensing actually occurs. The separation of control location from work location can be important for hazardous procedures or sterile procedures which require that the sample liquids be isolated from the operator.

The procedure for inserting or removing the bag magazine (8) into or from the immersion coupler (2) is shown in FIG. 2. The immersion coupler (2) includes a rigid chamber (11) for containing both hydraulic liquid (6) and the bag magazine (8). Before the port (12) of the rigid chamber (11) is opened, the hydraulic liquid (6) is removed from the rigid chamber (11) by refluxing to the hydraulic pump (1) or by discarding. After the port (12) is opened, the bag magazine (8) may be inserted or removed. The bag magazine (8) includes both a flexible bag structure (13) and a tubular spout (14). The tubular spout (14) connects to the topmost part (15) of the flexible bag structure (13). Like the hydraulic hose (5), the tubular spout (14) is adapted to transmit positive hydraulic displacements. If the tubular spout (14) requires significant length and/or flexibility, the tubular spout (14) may in fact include a section of hydraulic hose. If the tubular spout (14) does not require significant length and/or flexibility, the tubular spout (14) may be made of a rigid or semi-rigid material which renders the tubular spout (14) substantially inflexible. In any event, a given tubular spout (14) defines a hollow guide which must maintain a substantially constant carrying volume. To insert the bag magazine (8) into the rigid chamber (11), the tip of the tubular spout (16) is passed through the port (12) and threaded through the exit (17) of the rigid chamber (11). The passage of the tubular spout (14) through the exit (17) stoppers the exit (17). The flexible bag structure (13) follows the tubular spout (14) through the port (12) and is inserted into the rigid chamber (11).

The sequential procedure for preparing the immersion coupler (2) for use is illustrated as a series in FIGS. 3 (a), (b), (c), (d), (e), and (f). The series in FIG. 3 illustrates the flooding of the rigid chamber (11) with hydraulic liquid (6); the venting of entrapped air from the rigid chamber (11); the loading of the bag magazine (8) with sample liquid (7); the purging of entrapped air from the bag magazine (8); and the dispensing of sample liquid (7). After the bag magazine (8) is inserted into the immersion coupler (2), the port (12) is sealed closed and the rigid chamber (11) is flooded, as shown in FIG. 3 (a). During flooding, hydraulic liquid (6) fills the rigid chamber (11) by positive displacement generated by the hydraulic pump (1). As hydraulic liquid (6) fills the chamber, entrapped air (18) escapes through the air vent (19). Flooding is complete when the rigid chamber (11) is completely filled with hydraulic liquid (6) and substantially all entrapped air (18) has been eliminated through the air vent (19). When flooding is complete, the air vent (19) is closed. Complete flooding and the elimination of substantially all entrapped air (18) from the rigid chamber (11), as shown in FIG. 3 (b), establishes hydraulic contact between the hydraulic pump (1) and the flexible bag structure (13) of the bag magazine (8).

Once hydraulic contact is established with the bag magazine (8), the bag magazine is loaded with sample liquid (7). By refluxing hydraulic liquid (6) from the rigid chamber (11), the flexible bag structure (13) will expand and will aspirate sample liquid (7) into its enclosure (20). The reflux of hydraulic liquid (6) and the aspiration of sample liquid (7) are illustrated in FIG. 3 (c).

After sample liquid (7) is aspirated into the enclosure (20) of the flexible bag structure (13), entrapped air (21) is purged from the enclosure (20). Purging substantially all of the entrapped air (21) establishes hydraulic contact between the hydraulic pump (1) and the sample liquid (7) contained within the enclosure (20) of the flexible bag structure (13). FIG. 3 (d) illustrates the purging of entrapped air (21) from the enclosure (20) of the flexible bag structure (13). The flexible bag structure (13) is collapsed by positive displacement of hydraulic liquid (6) generated by the hydraulic pump (1) and passing into into the rigid chamber (11). Because entrapped air (21) rises to the topmost part of the enclosure (15) and because the tubular spout (14) is connected to the topmost part of the enclosure (15), entrapped air (21) expresses from the enclosure (20) through the tubular spout (14) as the flexible bag structure (13) collapses. In an alternative embodiment, the tubular spout (14) may be attached to the flexible bag structure (13) at locations other than the topmost part (15). For example, if the tubular spout (14) is attached to the bottom most part of the flexible bag structure (13), the user merely inverts the entire immersion coupler (2) in order to purge substantially all of the entrapped air (21) from the enclosure (20). The expression of entrapped air (21) will precede the expression of sample liquid (7). The expression of sample liquid (7) from the tubular spout (14) is a postive indication that the purging of entrapped air (21) from the enclosure (20) is substantially complete. Once substantially all of the entrapped air (21) has been eliminated from the enclosure (20), hydraulic contact is established between the hydraulic pump (1) and the sample liquid (7) contained within the bag magazine (8).

After hydraulic contact is established between the pump (1) and the sample liquid (7), the bag magazine (8) may be refilled by further aspiration of sample liquid (7) caused by further reflux of hydraulic liquid (6) back to the hydraulic pump (1). Refilling the bag magazine (8) is illustrated in FIG. 3 (e).

After the bag magazine (8) is filled with sample liquid (7) and hydraulic contact is established between the pump (1) and the sample liquid (7), the immersion coupler (2) can relay a quantitative positive hydraulic displacement from the hydraulic pump (1) to the bag magazine (8) and to the sample liquid (7) enclosed therein, for expressing and dispensing sample liquid (7) through the tubular spout (14) by quantitative positive hydraulic displacement. The immersion coupler (2) is shown dispensing sample liquid (7) by quantitative positive hydraulic displacement in FIG. 3 (f).

The diaphragmatic coupler (3) is shown in FIG. 4 in the open position; its corresponding insertable envelope magazine (9) is shown in FIG. 5; and the diaphragmatic coupler (3) is shown in the closed position with an envelope magazine (9) inserted therein in FIG. 6. The diaphragmatic coupler (3) includes a rigid chamber (22) which encloses both a hydraulic compartment (23) and the insertable envelope magazine (9). The rigid chamber (22) includes a port (24) which may be opened to insert or remove the envelope magazine (9). FIG. 4 shows the port (24) in the open positon for inserting the envelope magazine (9).

A diaphragm (25) partitions the rigid chamber to form the hydraulic compartment (23) for containing the hydraulic liquid (6). The diaphragm (25) is shown in FIG. 4 as a partial fragment in order to provide a view of the interior of the hydraulic compartment (23). The hydraulic compartment (23) encloses hydraulic liquid (6) and is hydraulically connected to the hydraulic pump (1). It is not necessary to reflux hydraulic liquid (6) from the rigid chamber (22) when changing the envelope magazine (9). It is a purpose of the hydraulic compartment (23) to contain the hydraulic liquid (6) and to eliminate the need to open the system of hydraulic liquid (6) to air when inserting the magazine.

The envelope magazine (9) is adapted for insertion into the diaphragmatic coupler (3). The envelope magazine (9) includes a tubular spout (26) and a flexible envelope structure (27) having a topmost part (28). The tubular spout (26) is connected to the topmost part (28) of the flexible envelope structure (27). The tubular spout (26) has a substantially constant carrying volume, as with the tubular spout (14) for the immersion coupler (2). To insert the envelope magazine (9) into the diaphragmatic coupler (3), the port (24) of the rigid chamber (22) is opened, the flexible envelope structure (27) is laid over the diaphragm (25), and the port (24) is closed over the envelope magazine (9). In the closed position, the port (24) prevents air from entering the rigid chamber (22). The shape of the envelope magazine (9) is configured to the shape of the diaphragm (25). The tubular spout (26) of the envelope magazine (9) passes through the exit (29) in the rigid chamber (22) of the diaphragmatic coupler (3). The passing of the tubular spout (26) of the envelope magazine (9) causes the exit (29) to be stoppered when the port (24) is closed so that air is prevented from entering the rigid chamber (22) of the diaphragmatic coupler (3).

In order to establish hydraulic contact between the hydraulic pump (1) and the flexible envelope, there must be an airless contact, or substantially airless contact, between the inserted envelope magazine (9) and the diaphragm (25). The detail of an airless contact is shown in FIG. 6. To achieve airless contact after the port (24) is closed, entrapped air is eliminated from the rigid chamber (22) and the interface between the diaphragm (25) and the flexible envelope structure (27) by the application of hydraulic pressure. Hydraulic pressure generated by the hydraulic pump (1) and applied to the hydraulic compartment (23) will force entrapped air from the rigid chamber (22).

The sequential procedure for preparing the diaphragmatic coupler (3) for use is illustrated as a series in FIGS. 7 (a), (b), (c), (d), and (e). FIG. 7 (a) illustrates the envelope magazine (9) enclosed in the rigid chamber (22) with the port (24) closed and the rigid chamber (22) purged of entrapped air. Hydraulic contact is established between the hydraulic pump (1) and the flexible envelope structure (27) (supra).

Once hydraulic contact is established, the hydraulic pump (1) refluxes hydraulic liquid (6) in order to partially evacuate hydraulic liquid (6) from the hydraulic compartment (23). The reflux of the hydraulic liquid (6) causes the flexible envelope structure (27) to expand and to aspirate sample liquid (7) into the enclosure (30) of the envelope magazine (9). The reflux of hydraulic liquid (6) and the aspiration of sample liquid (7) are illustrated in FIG. 7 (b).

After sample liquid (7) is aspirated into the enclosure (30) of the flexible envelope structure, entrapped air (31) is purged from its enclosure (30). Purging substantially all of the entrapped air (31) establishes hydraulic contact between the hydraulic pump (1) and the sample liquid (7) contained within the enclosure (30) of the flexible envelope structure (27). FIG. 7 (c) illustrates the purging of the enclosure (30) of the flexible envelope structure (27). The flexible envelope structure (27) is collapsed by positive displacement of hydraulic liquid (6) generated by the hydraulic pump (1) and passing into the hydraulic compartment (23) within rigid chamber (22). Because entrapped air (31) rises to the topmost part of the enclosure (28) and because the tubular spout (26) is connected to the topmost part of the enclosure (28), entrapped air (31) expresses from the enclosure (30) through the tubular spout (26) as the flexible envelope structure (27) collapses. The expression of entrapped air (31) will precede the expression of sample liquid (7). The expression of sample liquid (7) from the tubular spout (26) is a positive indication that the purging of entrapped air (31) from the enclosure (30) is substantially complete. Once entrapped air (31) has been substantially eliminated from the enclosure (30), hydraulic contact is established between the hydraulic pump (1) and the sample liquid (7) contained within the envelope magazine (9).

After hydraulic contact is established between the pump (1) and the sample liquid (7), the envelope magazine (9) may be refilled by further aspiration caused by further reflux of hydraulic liquid (6) from the hydraulic compartment (23) back to the hydraulic pump (1). Refilling the envelope magazine (9) is illustrated in FIG. 7 (d).

After the envelope magazine (9) is filled with sample liquid (7) and hydraulic contact is established between the pump (1) and the sample liquid (7), the diaphragmatic coupler (3) can relay a quantitative positive hydraulic displacement from the hydraulic pump (1) to the envelope magazine (9) and to the sample liquid (7) enclosed therein for expressing sample liquid (7) and dispensing sample liquid (7) through the tubular spout (26) by quantitative positive hydraulic displacement. The diaphragmatic coupler (3) is shown dispensing sample liquid (7) by quantitative positive hydraulic displacement in FIG. 7 (e).

A mechanical coupler (4) is shown in FIG. 8 and its corresponding insertable mechanical magazine (10) is shown in FIG. 9. The mechanical coupler (4) includes a coupler piston (32) and a coupler cylinder (33) within a housing (34). The coupler piston (32) is slidable within the coupler cylinder (33). The coupler piston (32) and coupler cylinder (33) define a chamber (35) which varies in size as the coupler piston (32) slides therein. The chamber (35) encloses hydraulic liquid (6 and is hydraulically connected to the hydraulic pump (1). FIG. 8 shows the coupler housing (34) and the top of the coupler piston (32). Attached to the coupler housing (34) is a housing brace (36) and attached to the top of the coupler piston (32) is a piston brace (37). Both the housing brace (36) and the piston brace (37) hold the mechanical magazine (10) in position when it is inserted into the mechanical coupler (4).

The mechanical magazine (10) includes a magazine piston (38) and a magazine cylinder (39). The magazine piston (38) is slidable within the magazine cylinder (39). The magazine piston (38) and magazine cylinder (39) define an enclosure (40) which varies in volume as the magazine piston (38) slides therein. The magazine piston (38) can slide the entire length of the magazine cylinder (39) so as to reduce the volume of the enclosure (40) to nil. The enclosure (40) is configured so that the topmost part (41) is the last volume as the piston slides to reduce the volume to nil. The mechanical magazine (10) may also include a bellows (42) to shield the enclosure (40) against contamination. Attached to the magazine piston (38) is a piston brace receptor (43) and attached to the magazine cylinder (39) is a cylinder brace receptor (44). When the mechanical magazine (10) is inserted into the mechanical coupler (4), the piston brace receptor (43) is held by the piston brace (37) and the cylinder brace receptor (44) is held by the housing brace (36). When the mechanical magazine (10) is inserted into the mechanical coupler (4) and the braces and receptors are connected, the magazine piston (38) and coupler piston (32) slide in concert within their respective cylinders while the magazine cylinder (39) and the coupler cylinder (33) are fixed in their relative positions with respect to the housing (34). When the mechanical magazine (10) is inserted and connected, hydraulic contact is established between the magazine piston (38) and the hydraulic pump (1).

The sequential procedure for preparing the mechanical coupler (4) for use is illustrated as a series in FIGS. 10 (a), (b), (c), (d), and (e). FIG. 10 (a) illustrates the attachment of the inserted mechanical magazine (10) within the mechanical coupler (4). The magazine piston (38) is held to the coupler piston (32) by the attachment of the piston brace (37) to the piston brace receptor (43). The piston attachment causes the magazine piston (38) and coupler piston (32) t slide identically and establishes hydraulic contact between the hydraulic pump (1) and the magazine piston (38). The magazine cylinder (39) is held in a fixed relative position to the coupler cylinder (33) by the attachment of the housing brace (36) to the cylinder brace receptor (44). The combination of the piston attachment and the cylinder attachment causes the volume of the enclosure (40) of the mechanical magazine (10) to vary proportionally to the volume of the chamber (35) of the mechanical coupler (4). Since the chamber (35) is hydraulically connected to the hydraulic pump (1), positive displacements of hydraulic liquid (6) cause expansion of the chamber (35) and the collapse of the magazine enclosure (40).

Once hydraulic contact is established, the hydraulic pump (1) refluxes hydraulic liquid (6) in order to partially evacuate hydraulic liquid (6) from the chamber (35) of the mechanical coupler (4). The reflux of the hydraulic liquid (6) causes the enclosure (40) of the mechanical magazine (10) to expand and to aspirate sample liquid (7) into the enclosure (40). The reflux of hydraulic liquid (6) and the aspiration of sample liquid (7) are illustrated in FIG. 10 (b).

After sample liquid (7) is aspirated into the enclosure (40) of the mechanical magazine (10), entrapped air (45) is purged from its enclosure (40). Purging substantially all of the entrapped air (45) establishes hydraulic contact between the hydraulic pump (1) and the sample liquid (7) contained within the enclosure (40) of the mechanical magazine (10). FIG. 10 (c) illustrates the purging of entrapped air (45) from the enclosure (40) of the mechanical magazine (10). The enclosure (40) of the mechanical magazine (10) is collapsed by positive displacement of hydraulic liquid (6) generated by the hydraulic pump (1) and passing into the chamber (35) of the mechanical coupler (4). Because entrapped air (45) rises to the topmost part of the enclosure (41) and because the tubular spout (46) is connected to the topmost part of the enclosure (41), entrapped air (45) expresses from the enclosure (40) through the tubular spout (46) as the enclosure (40) of the mechanical magazine (10) collapses. The expression of entrapped air (45) will precede the expression of sample liquid (7). Because the tubular spout (46) has a substantially constant carrying volume, the expression of sample liquid (7) from the tubular spout (46) is a postive indication that the purging of entrapped air (45) from the enclosure (40) is substantially complete. Once substantially all of the entrapped air (45) has been eliminated from the enclosure (40), hydraulic contact is established between the hydraulic pump (1) and the sample liquid (7) contained within the mechanical magazine (10).

After hydraulic contact is established between the pump (1) and the sample liquid (7), the mechanical magazine (10) may be refilled by further aspiration caused by further reflux of hydraulic liquid (6) from the chamber (35) of the mechanical coupler (4) back to the hydraulic pump (1). Refilling the mechanical magazine (10) is illustrated in FIG. 10 (d).

After the enclosure (40) of the mechanical magazine (10) is filled with sample liquid (7) and hydraulic contact is established between the pump (1) and the sample liquid (7), the mechanical coupler (4) can relay a quantitative positive hydraulic displacement from the hydraulic pump (1) to the magazine piston (38) and to the sample liquid (7) enclosed within the enclosure (40) of the mechanical magazine (10) for expressing sample liquid (7) and dispensing sample liquid (7) through the tubular spout (46) by quantitative positive hydraulic displacement. The mechanical coupler (4) is shown dispensing sample liquid (7) by quantitative positive hydraulic displacement in FIG. 10 (e).

I claim:

1. A hydraulic dispenser for aspirating and expressing a sample liquid using a hydraulic liquid comprising:
   a magazine which is both insertable and purgable for holding the sample liquid and
   a hydraulic press which includes a hydraulic pump for generating a displacement of the hydraulic liquid, a magazine coupler for coupling the hydraulic pump and said magazine, and a housing for enclosing the hydraulic liquid and for hydraulically connecting the hydraulic pump to the magazine coupler,
   said magazine including an enclosure for holding the sample liquid, the enclosure having a topmost part and being both expandable and collapsible and including a tubular spout connected to and communicating with the topmost part of the enclosure of said magazine, the tubular spout for guiding the sample liquid which is aspirated into and expressed from the enclosure of said magazine, said magazine adapted to be inserted into and coupled to the magazine coupler,
   the hydraulic pump including means for generating a reflux displacement of the enclosed hydraulic liquid and for generating a quantitative positive displacement of the enclosed hydraulic liquid,
   the coupler for transmitting the reflux displacement between the hydraulic pump and said magazine for expanding the enclosure of said magazine and aspirating sample liquid through the tubular spout and into the enclosure,
   whereby sample liquid is aspirated through the tubular spout and into the enclosure of said magazine by reflux displacement generated by the hydraulic pump,
   the coupler for transmitting the quantitative positive displacement between the hydraulic pump and said magazine for collapsing the enclosure of said magazine and firstly expressing substantially all air entrapped therein through the tubular spout and secondly expressing sample liquid contained therein through the tubular spout,
   whereby firstly air is substantially eliminated from said magazine and hydraulic contact is established between the hydraulic pump and the sample liquid contained within said magazine and
   whereby secondly the expressed sample liquid is dispensed from said magazine by quantitative positive hydraulic displacement generated by the hydraulic pump.

2. A hydraulic dispenser for aspirating and expressing a sample liquid using a hydraulic liquid comprising:
   a bag magazine which is both insertable and purgable for holding the sample liquid and
   a hydraulic press which includes a hydraulic pump for generating a displacement of the hydraulic liquid, an immersion coupler for coupling the hydraulic pump and said bag magazine, and a housing for enclosing the hydraulic liquid and for hydraulically connecting the hydraulic pump to the immersion coupler,
   said bag magazine including a flexible bag structure defining an enclosure for holding the sample liquid, the flexible bag structure having a topmost part and being both expandable and collapsible, said bag magazine including a tubular spout connected to and communicating with the topmost part of the enclosure of the flexible bag structure, the tubular spout for guiding the sample liquid aspirated into and expressed from the enclosure of the flexible bag structure, said bag magazine adapted to be inserted into and coupled to the immersion coupler, the hydraulic pump including means for generating a reflux displacement of the enclosed hydraulic liquid and for generating a quantitative positive displacement of the enclosed hydraulic liquid, the immersion coupler including a rigid chamber hydraulically connected to the hydraulic pump by the housing for enclosing the hydraulic liquid and for enclosing the flexible bag structure of the bag magazine, the rigid chamber including a port which can be opened for inserting and removing the bag magazine and which can be closed and sealed with the bag magazine inserted, the rigid chamber defining an exit for passing the tubular spout of the inserted bag magazine from the rigid chamber, the exit stoppered by the passing of the tubular spout, the immersion coupler including an air vent for purging air from the closed rigid chamber when the rigid chamber is flooded from the positive displacement of the hydraulic liquid generated by the hydraulic pump, whereby the flooding of the rigid chamber purges substantially all air from the rigid chamber of the immersion coupler, establishing hydraulic contact between the hydraulic pump and the inserted bag magazine and enabling the immersion coupler to transmit displacements between the hydraulic pump and the inserted bag structure, the immersion coupler for transmitting the reflux displacement from the hydraulic pump to the bag magazine for expanding the bag structure and aspirating sample liquid through the tubular spout into the flexible bag structure, whereby sample liquid is aspirated through the tubular spout and into the enclosure of the flexible bag structure by reflux displacement generated by the hydraulic pump, the immersion coupler for transmitting the quantitative positive displacement between the hydraulic pump and said bag magazine for collapsing the enclosure of the flexible bag structure and firstly expressing substantially all air entrapped therein through the tubular spout and secondly expressing sample liquid contained therein through the tubular spout, whereby firstly air is substantially eliminated from said bag magazine and hydraulic contact is established between the hydraulic pump and the sample liquid contained within said bag magazine and whereby secondly the expressed sample liquid is dispensed from said bag magazine by quantitative positive hydraulic displacement generated by the hydraulic pump.

3. A hydraulic dispenser for aspirating and expressing a sample liquid using a hydraulic liquid comprising:

an envelope magazine which is both insertable and purgable for holding the sample liquid and a hydraulic press which includes a hydraulic pump for generating a displacement of the hydraulic liquid, a diaphragmatic coupler for coupling the hydraulic pump and said envelope magazine, and a housing for enclosing the hydraulic liquid and for hydraulically connecting the hydraulic pump to the diaphragmatic coupler, said envelope magazine including a flexible envelope structure defining an enclosure for holding the sample liquid, the flexible envelope structure having a topmost part and being both expandable and collapsible, said envelope magazine including a tubular spout connected to and communicating with the topmost part of the enclosure of the flexible envelope structure, the tubular spout for guiding the sample liquid aspirated into and expressed from the enclosure of the flexible envelope structure, said envelope magazine adapted to be inserted into and coupled to the diaphragmatic coupler, the diaphragmatic coupler including a rigid chamber partitioned by a diaphragm, the partitioning diaphragm defining a hydraulic compartment enclosed within the rigid chamber, the hydraulic compartment hydraulically connected to the hydraulic pump, the rigid chamber including a port which can be opened for inserting and removing the envelope magazine and which can be closed with the envelope magazine inserted and sealed with respect to atmospheric pressure, the rigid chamber defining an exit for passing the tubular spout of the inserted envelope magazine from the rigid chamber, the exit being stoppered by the passing of the tubular spout, the hydraulic pump including means for generating a hydraulic pressure exceeding atmospheric pressure within the hydraulic compartment and the rigid chamber, for generating reflux displacement of the enclosed hydraulic liquid for collapsing the hydraulic compartment, and for generating quantitative positive hydraulic displacement of the enclosed hydraulic liquid for expanding the hydraulic compartment, the hydraulic compartment for transferring the hydraulic pressure from the hydraulic pump to the rigid chamber for expressing substantially all entrapped air from the rigid chamber, whereby the hydraulic pressure causes substantially all air to vent from the rigid chamber across the port of the diaphragmatic coupler, establishing hydraulic contact between the hydraulic pump and the inserted envelope magazine and enabling the diaphragmatic coupler to transmit displacements between the hydraulic pump and the inserted envelope structure, the diaphragmatic coupler for transmitting the reflux displacement between the hydraulic pump and the envelope magazine for expanding the flexible envelope structure and aspirating sample liquid through the tubular spout into the envelope magazine, whereby sample liquid is aspirated through the tubular spout and into the envelope structure by reflux displacement generated by the hydraulic pump, the diaphragmatic coupler for transmitting the quantitative positive displacement between the hydraulic pump and the envelope magazine for collapsing the flexible envelope structure and firstly expressing substantially all air entrapped therein through the tubular spout and secondly expressing sample liquid contained therein through the tubular spout, whereby firstly entrapped air is substantially eliminated from the envelope magazine and hydraulic contact is established between the hydraulic pump and the sample liquid enclosed by the envelope magazine, and whereby secondly the expressed sample liquid is dispensed from the envelope magazine by the quantitative positive hydraulic displacement generated by the hydraulic pump.

4. A hydraulic dispenser for aspirating and expressing a sample liquid using a hydraulic liquid comprising:
a mechanical magazine which is both insertable and purgable for holding the sample liquid and
a hydraulic press which includes a hydraulic pump for generating a displacement of the hydraulic liquid, a mechanical coupler for coupling the hydraulic pump and said mechanical magazine, and a housing for enclosing the hydraulic liquid and for hydraulically connecting the hydraulic pump to the mechanical coupler,
said mechancial magazine including a magazine piston and a magazine cylinder composed of a rigid material, said magazine piston slidable within said magazine cylinder, said magazine cylinder and said magazine piston defining an enclosure which is both expandable and collapsible as said magazine piston slides within said magazine cylinder, the magazine enclosure for holding the sample liquid, the enclosure having a topmost part, said mechanical magazine including a tubular spout connected to and communicating with the topmost part of the enclosure of the flexible envelope structure, the tubular spout for guiding the sample liquid aspirated into and expressed from the enclosure of the flexible envelope structure, said mechanical magazine adapted to be inserted into and coupled to the mechanical coupler,
the hydraulic pump including means for generating a reflux displacement of the enclosed hydraulic liquid and for generating a quantitative positive displacement of the enclosed hydraulic liquid,
the mechanical coupler including a coupler piston and a coupler cylinder, the coupler piston slidable within the coupler cylinder, the coupler cylinder having means for restraining said magazine cylinder and the coupler piston having a means for attaching to said magazine piston for transmitting the reflux displacement from the hydraulic pump to said magazine piston for expanding the enclosure and aspirating the sample liquid through the tubular spout into the enclosure,
whereby the sample liquid is aspirated through the tubular spout and into the enclosure by the reflux displacement generated by the hydraulic pump,
the coupler piston of the mechanical coupler slidable for transmitting the quantitative positive displacement from the hydraulic pump to said magazine piston for collapsing the enclosure and firstly expressing substantially all entrapped air from the topmost part of the enclosure through the tubular spout and secondly expressing the sample liquid contained therein through the tubular spout,
whereby firstly entrapped air is substantially eliminated from the mechanical magazine and hydraulic contact is established between the hydraulic pump and the sample liquid enclosed by the mechanical magazine, and
whereby secondly the expressed sample liquid is dispensed from the mechanical magazine by the quantitative positive hydraulic displacement generated by the hydraulic pump.

5. A hydraulic dispenser for aspirating and expressing a sample liquid using a hydraulic liquid, the sample liquid held by an insertable and purgable magazine, the magazine including an enclosure both expandable and collapsible for holding the sample liquid and having a topmost part, the enclosure of the magazine connected to and communicating with a tubular spout for purging entrapped air out from the topmost part of the enclosure, for guiding sample liquid which is aspirated into the enclosure, and for guiding sample liquid which is expressed from the enclosure, the magazine adapted to be inserted into and coupled to the hydraulic dispenser, the hydraulic dispenser comprising:
a hydraulic press including a hydraulic pump for generating a displacement of the hydraulic liquid, a magazine coupler for coupling the hydraulic pump and the magazine, and a housing for enclosing the hydraulic liquid and for hydraulically connecting the hydraulic pump to the magazine coupler,
the hydraulic pump including means for generating a reflux displacement of the enclosed hydraulic liquid and for generating a quantitative positive displacement of the enclosed hydraulic liquid,
the coupler for transmitting the reflux displacement between the hydraulic pump and the magazine for expanding the enclosure of the magazine and aspirating sample liquid through the tubular spout into the enclosure,
whereby sample liquid is aspirated through the tubular spout and into the enclosure by reflux displacement generated by the hydraulic pump,
the coupler for transmitting the quantitative positive displacement between the hydraulic pump and the magazine for collapsing the enclosure of the magazine and firstly expressing substantially all air entrapped therein through the tubular spout and secondly expressing sample liquid contained therein through the tubular spout,
whereby firstly entrapped air is substantially eliminated from the magazine and hydraulic contact is established between the hydraulic pump and the sample liquid contained within the magazine and
whereby secondly the expressed sample liquid is dispensed from the magazine by quantitative positive hydraulic displacement generated by the hydraulic pump.

6. A hydraulic dispenser for aspirating and expressing a sample liquid using a hydraulic liquid, the sample liquid held by a bag magazine, the bag magazine being insertable and purgable, the bag magazine including a flexible bag structure both expandable and collapsible for holding the sample liquid and having a topmost part, the bag structure connected to and communicating with a tubular spout for purging entrapped air from the topmost part of the bag structure, for guiding sample liquid which is aspirated into the bag structure, and for guiding sample liquid which is expressed from the bag structure, the bag magazine adapted to be inserted into and coupled to the hydraulic dispenser, the hydraulic dispenser comprising:
a hydraulic press including a hydraulic pump for generating a displacement of the hydraulic liquid, an immersion coupler for coupling the hydraulic pump and the bag magazine, and a housing for enclosing the hydraulic liquid and for hydraulically connecting the hydraulic pump to the immersion coupler,
the hydraulic pump including means for generating a reflux displacement of the enclosed hydraulic liquid and for generating a quantitative positive displacement of the enclosed hydraulic liquid, the immersion coupler including a rigid chamber hydraulically connected by the hydraulic housing to the hydraulic pump for enclosing the hydraulic liquid, the rigid chamber including a port which can be opened for inserting and removing the bag magazine and which can be closed and sealed with the bag magazine inserted, the rigid chamber defining an exit for passing the tubular spout of the inserted bag magazine from the rigid chamber, the exit stopped by the passing of the tubular spout, the immersion coupler including an air vent for purging entrapped air from the closed rigid chamber when the rigid chamber is flooded from the positive displacement of the hydraulic liquid generated by the hydraulic pump, whereby the flooding of the rigid chamber purges substantially all entrapped air from the rigid chamber of the immersion coupler, establishing hydraulic contact between the hydraulic pump and the inserted bag magazine and enabling the immersion coupler to transmit displacements between the hydraulic pump and the inserted bag structure, the immersion coupler for transmitting the reflux displacement from the hydraulic pump to the bag magazine for expanding the bag structure and aspirating sample liquid through the tubular spout into the bag structure, whereby sample liquid is aspirated through the tubular spout and into the bag structure by reflux displacement generated by the hydraulic pump, the immersion coupler for transmitting the quantitative positive displacement between the hydraulic pump and the bag magazine for collapsing the flexible bag structure and firstly expressing entrapped air therein through the tubular spout and secondly expressing sample liquid contained therein through the tubular spout, whereby firstly entrapped air is substantially eliminated from the bag magazine and hydraulic contact is established between the hydraulic pump and the sample liquid contained within the bag magazine, and whereby secondly the expressed sample liquid is dispensed from the bag magazine by the quantitative positive hydraulic displacement; generated by the hydraulic pump.

7. A hydraulic dispenser for aspirating and expressing a sample liquid using a hydraulic liquid, the sample liquid held by an envelope magazine, the envelope magazine being insertable and purgable, the envelope magazine including a flexible envelope structure both expandable and collapsible for holding the sample liquid and having a topmost part, the envelope structure connected to and communicating with a tubular spout for purging entrapped air from the topmost part of the envelope structure, for guiding sample liquid which is aspirated into the envelope structure, and for guiding sample liquid which is expressed from the envelope structure, the envelope magazine adapted to be inserted into and coupled to the hydraulic dispenser, the hydraulic dispenser comprising:

a hydraulic press including a hydraulic pump for generating a displacement of the hydraulic liquid, a diaphragmatic coupler for coupling the hydraulic pump and the envelope magazine, and a housing for enclosing the hydraulic liquid and for hydraulically connecting the hydraulic pump to the diaphragmatic coupler, the diaphragmatic coupler including a rigid chamber partitioned by a diaphragm, the partitioning diaphragm defining a hydraulic compartment enclosed within the rigid chamber, the hydraulic compartment hydraulically connected to the hydraulic pump, the rigid chamber including a port which can be opened for inserting and removing the envelope magazine and which can be closed with the envelope magazine inserted and sealed with respect to atmospheric pressure, the rigid chamber defining an exit for passing the tubular spout of the inserted envelope magazine from the rigid chamber, the exit being stoppered by the passing of the tubular spout, the hydraulic pump including means for generating a hydraulic pressure exceeding atmospheric pressure of the enclosed hydraulic liquid with the port closed for pressurizing the hydraulic compartment and the rigid chamber, for generating a reflux displacement of the enclosed hydraulic liquid for collapsing the hydraulic compartment, and for generating quantitative positive hydraulic displacement of the enclosed hydraulic liquid for expanding the hydraulic compartment, the hydraulic compartment for transferring the hydraulic pressure from the hydraulic press to the rigid chamber for expressing entrapped air from the rigid chamber, whereby the hydraulic pressure purges substantially all entrapped air from the rigid chamber of the diaphragmatic coupler, establishing hydraulic contact between the hydraulic pump and the inserted envelope magazine and enabling the diaphragmatic coupler to transmit displacements between the hydraulic pump and the inserted envelope structure, the diaphragmatic coupler for transmitting the reflux displacement between the hydraulic pump and the envelope magazine for expanding the flexible envelope structure and aspirating sample liquid through the tubular spout into the envelope magazine, whereby sample liquid is aspirated through the tubular spout and into the envelope structure by reflux displacement generated by the hydraulic pump, the diaphragmatic coupler for transmitting the quantitative positive displacement between the hydraulic pump and the envelope magazine for collapsing the flexible envelope structure and firstly expressing entrapped air therein through the tubular spout and secondly expressing sample liquid contained therein through the tubular spout, whereby firstly entrapped air is substantially eliminated from the envelope magazine and hydraulic contact is established between the hydraulic pump and the sample liquid enclosed by the envelope magazine, and whereby secondly the expressed sample liquid is dispensed from the envelope magazine by the quantitative positive hydraulic displacement generated by the hydraulic pump.

8. A hydraulic dispenser for aspirating and expressing a sample liquid using a hydraulic liquid, the sample liquid held by a mechanical magazine, the mechanical magazine being insertable and purgable, the mechanical magazine including a magazine piston and a magazine cylinder composed of rigid material, the magazine piston slidable within the magazine cylinder, the magazine cylinder and the magazine piston defining an enclosure which is both expandable and collapsible as the magazine piston slides within the magazine cylinder, the enclosure for holding the sample liquid, the enclosure having a topmost part, the magazine cylinder connected to a tubular spout, the enclosure communicating with the tubular spout at the topmost part for purging entrapped air from the enclosure, for guiding sample liquid which is aspirated into the enclosure, and for guiding sample liquid which is expressed from the enclosure, the mechanical magazine adapted to be inserted into and coupled to the hydraulic dispenser, the hydraulic dispenser comprising:

- a hydraulic press including a hydraulic pump for generating a displacement of the hydraulic liquid, a mechanical coupler for coupling the hydraulic pump and the mechanical magazine, and a housing for enclosing the hydraulic liquid and for hydraulically connecting the hydraulic pump to the mechanical coupler,
- the hydraulic pump including means for generating a reflux displacement of the enclosed hydraulic liquid and for generating a quantitative positive displacement of the enclosed hydraulic liquid,
- the mechanical coupler including a coupler piston and a coupler cylinder, the coupler piston slidable within the coupler cylinder, the coupler cylinder having means for restraining the magazine cylinder and the coupler piston having a means for attaching to the magazine piston for transmitting the reflux displacement from the hydraulic pump to the magazine piston for expanding the enclosure and aspirating the sample liquid through the tubular spout into the enclosure,
- whereby the sample liquid is aspirated through the tubular spout and into the enclosure by the reflux displacement generated by the hydraulic pump,
- the coupler piston of the mechanical coupler slidable for transmitting the quantitative positive displacement from the hydraulic pump to the magazine piston for collapsing the enclosure and firstly expressing entrapped air from the topmost part of the enclosure through the tubular spout and secondly expressing the sample liquid contained therein through the tubular spout,
- whereby firstly entrapped air is substantially eliminated from the mechanical magazine and hydraulic contact is established between the hydraulic pump and the sample liquid enclosed by the mechanical magazine, and
- whereby secondly the expressed sample liquid is dispensed from the mechanical magazine by the quantitative positive hydraulic displacement generated by the hydraulic pump.

9. An insertable and purgable envelope magazine for inserting into and coupling to a hydraulic dispenser having a diaphragmatic coupler with a rigid chamber and a diaphragm for partitioning the rigid chamber into a hydraulic compartment, for receiving, containing, and providing a sample liquid to be dispensed by the hydraulic dispenser, and for automatically eliminating substantially all entrapped air contained therein comprising:

- a flexible envelope structure defining an enclosure for holding the sample liquid, the flexible envelope structure adapted to be coupled to the diphragmatic coupler, the enclosure having a topmost part, the flexible envelope structure defining an orifice communicating with the topmost part of the enclosure, the enclosure being configured for the sample liquid to be contained by the topmost part only when the enclosure is completely filled with the sample liquid, the flexible envelope structure being both expandable and collapsible for expanding and collapsing the enclosure, the flexible envelope structure having means for coupling to the diaphragmatic coupler for expanding and collapsing the flexible envelope structure and
- a tubular spout attached to the flexible envelope structure at the orifice and defining a hollow guide for guiding the sample liquid to and from the enclosure via the orifice, the hollow guide having a substantially constant carrying volume, the hollow guide having a cross dimension and the spout having surface properties for holding the sample liquid across the cross dimension by sample liquid surface tension sufficient to overcome the floation of entrapped air within the guide,
- whereby collapsing the flexible envelope structure will cause substantially all entrapped air to vent from the enclosure prior to the expression of sample liquid from the enclosure when the envelope magazine is held in its normally upright position.

10. A method for aspirating and expressing sample liquid into and from an insertable magazine using a hydraulic press; the magazine defining an enclosure for containing the sample liquid, the enclosure having a topmost part, the magazine being both expandable and collapsible and including a tubular spout connected to and communicating with the topmost part of the enclosure; the hydraulic press including a housing for enclosing hydraulic liquid, a hydraulic pump for generating a reflux displacement of and a quantitative positive displacement of the enclosed hydraulic liquid, and a magazine coupler for coupling to the magazine, the coupler having means both for transmitting the reflux displacement between the hydraulic pump and the magazine for expanding the enclosure of said magazine, whereby causing sample liquid to aspirate into the magazine, and for transmitting the quantitative positive displacement between the hydraulic pump and the magazine for collapsing the enclosure of the magazine, whereby firstly causing substantially all entrapped air to express from the magazine and secondly causing the sample liquid to express from the magazine, the housing for hydraulically connecting the pump to the coupler; the method comprising:

- inserting the magazine into the coupler and connecting the magazine thereto,
- then aspirating sample liquid through the tubular spout and into the magazine by generating the reflux displacement of the hydraulic liquid by means of the pump, the reflux displacement transmitted to the magazine from the pump by the coupler, whereby the magazine is loaded with sample liquid,
- then expressing substantially all air from the magazine by generating the positive displacement of the hydraulic liquid by means of the pump, the positive displacement transmitted to the magazine from the pump by the coupler,
- whereby air is substantially eliminated from the magazine and hydraulic contact is established between the pump and the sample liquid enclosed by the magazine, and then quantitatively expressing sample liquid from the magazine by generating a quantitative positive displacement of hydraulic liquid by means of the pump, the quantitative positive displacement transmitted to the magazine from the pump by the coupler, whereby the expressed sample liquid is quantitatively dispensed from the magazine by the positive hydraulic displacement generated by the hydraulic pump.

11. A hydraulic dispenser for refluxing and expressing a sample liquid using a hydraulic liquid, the sample liquid held by an insertable magazine, the magazine including a collapsible enclosure for holding the sample liquid, the enclosure of the magazine connected to and communicating with a tubular spout for guiding the sample liquid which is expressed from the collapsible enclosure, the magazine adapted to be inserted into and coupled to the hydraulic dispenser, the hydraulic dispenser comprising:

a hydraulic press including a hydraulic pump for generating a displacement of the hydraulic liquid, a magazine coupler for coupling the hydraulic pump and the magazine, and a housing for enclosing the hydraulic liquid and for hydraulically connecting the hydraulic pump to the magazine coupler, the hydraulic pump including means for generating both a quantitative positive displacement and a reflux displacement of the enclosed hydraulic liquid, the coupler including means for transmitting the quantitative positive displacement from the hydraulic pump to the magazine for collapsing the enclosure of the magazine and expressing the sample liquid held therein through the tubular spout and including means for transmitting the reflux displacement for expanding the enclosure and aspirating the sample liquid from the tubular spout into the enclosure of the magazine, whereby the sample liquid is aspirated into the magazine by reflux displacement generated by the hydraulic pump and is quantitatively dispensed from the magazine by positive hydraulic displacement generated by the hydraulic pump.

12. A hydraulic dispenser for aspirating and expressing a sample liquid using a hydraulic liquid, the sample liquid held by an insertable magazine, the magazine including an enclosure both expandable and collapsible for holding the sample liquid, the enclosure of the magazine connected to and communicating with a tubular spout for guiding sample liquid which is aspirated into the enclosure and sample liquid which is expressed from the enclosure, the magazine adapted to be inserted into and coupled to the hydraulic dispenser, the hydraulic dispenser comprising:

a hydraulic press including a hydraulic pump for generating a displacement of the hydraulic liquid, a magazine coupler for coupling the hydraulic pump and the magazine, and a housing for enclosing the hydraulic liquid and for hydraulically connecting the hydraulic pump to the magazine coupler, the hydraulic pump including means for generating a reflux displacement of the enclosed hydraulic liquid and for generating a quantitative positive displacement of the enclosed hydraulic liquid, the coupler for transmitting the reflux displacement between the hydraulic pump and the magazine for expanding the enclosure of the magazine and aspirating sample liquid through the tubular spout and into the enclosure, whereby sample liquid is aspirated through the tubular spout and into the enclosure of the magazine by reflux displacement generated by the hydraulic pump, the coupler for transmitting the quantitative positive displacement from the hydraulic pump to the magazine for collapsing the enclosure of the magazine and expressing the sample liquid held therein through the tubular spout, whereby the expressed sample liquid is dispensed from the magazine by quantitative positive hydraulic displacement generated by the hydraulic pump.

* * * * *